United States Patent
Ishioka et al.

(10) Patent No.: US 6,264,897 B1
(45) Date of Patent: Jul. 24, 2001

(54) OZONE GENERATOR

(75) Inventors: Hisamichi Ishioka; Kazuki Kai, both of Kanagawa; Takaya Nishikawa, Mie; Eiji Sakai, Chiba; Terushige Ogawa, Kanagawa; Atsumi Miyake, Tokyo, all of (JP)

(73) Assignee: Fuji Electric Co., Ltd., Kawasaki (JP)

( * ) Notice: Subject to any disclaimer, the term of this patent is extended or adjusted under 35 U.S.C. 154(b) by 0 days.

(21) Appl. No.: 09/492,757

(22) Filed: Jan. 27, 2000

(30) Foreign Application Priority Data

Feb. 5, 1999 (JP) .................................................. 11-028389

(51) Int. Cl.⁷ ................................................... B01J 19/08
(52) U.S. Cl. ........................................................ 422/186.07
(58) Field of Search ......................................... 422/186.07

(56) References Cited

U.S. PATENT DOCUMENTS 5,487,874 * 1/1996 Gibboney, Jr. .................. 422/186.07

FOREIGN PATENT DOCUMENTS 9-315803    12/1997   (JP) .

* cited by examiner

Primary Examiner—Kishor Mayekar
(74) Attorney, Agent, or Firm—Kanesaka & Takeuchi

(57) ABSTRACT

An ozone generator is formed of at least one ozone-generating pipe, a feed gas chamber connected to one side of the ozone-generating pipe, and an ozonized gas chamber connected to the other side of the ozone-generating pipe. When an oxygen-containing feed gas is supplied to the ozone-generating pipe through the feed gas chamber, the feed gas is subjected to silent discharge in a gap between a ground electrode and a high-voltage electrode in the ozone-generating pipe to thereby allow the feed gas to change to an ozonized gas, which is then fed to the ozonized gas chamber. Gas-permeable flame-propagation-preventing members are arranged to sandwich the discharge gap therebetween to prevent outward propagation of ozonized gas decomposition flame in case the frame is induced to the ozonized gas by spark discharge in the ozone-generating pipe. The ozone generator can be used safely.

8 Claims, 10 Drawing Sheets

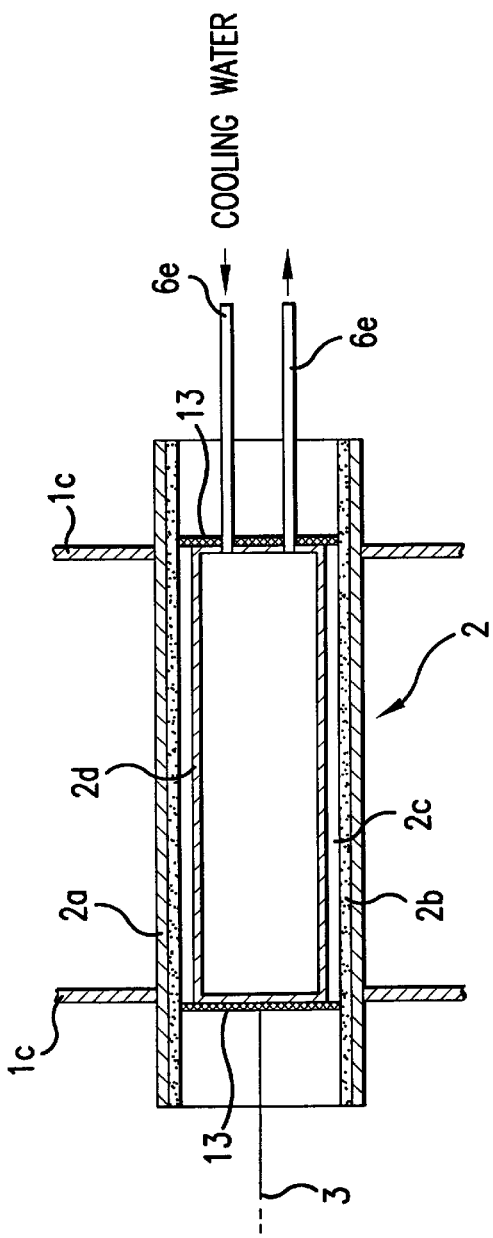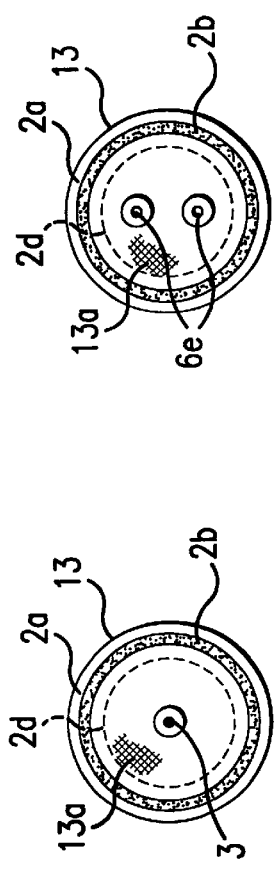

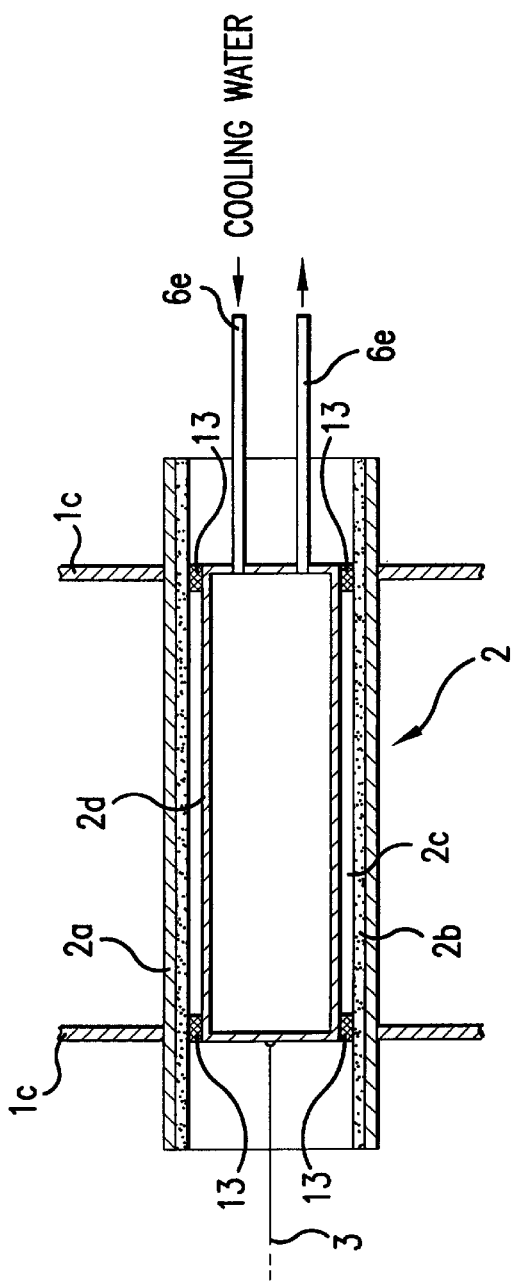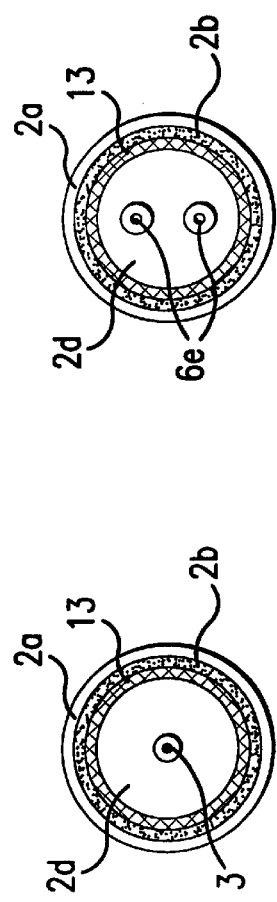
FIG.3a
FIG.3b
FIG.3c

OZONE GENERATOR

BACKGROUND OF THE INVENTION AND RELATED ART STATEMENT

The present invention relates to an ozone generator for industrial use, such as water supply and sewage treatment, pulp-bleaching, and the like, which require a large amount of ozone.

A well-known ozone generator for industrial use changes an oxygen-containing feed gas to an ozonized gas or ozone gas by using silent discharge and is disclosed in Japanese Laid-Open Patent Publication No. 2-184506 (U.S. Pat. No. 5,034,198) or Japanese Laid-Open Patent Publication No. 9-315803, filed by the applicant of the present invention.

FIGS. 8(a) and 8(b) illustrate the structure of a conventional ozone generator disclosed in Japanese Laid-Open Patent Publication No. 9-315803. In FIG. 8(a), reference number 1 designates a gas chamber formed of stainless steel or similar material having high corrosion resistance to ozone, and reference number 2 designates ozone-generating pipes arranged in a central portion of the gas chamber 1 to be parallel to each other.

The gas chamber 1 is formed of a cylindrical or rectangular hollow body portion 1a, end plates 1b occluding opposite ends of the body portion 1a, and a pair of support plates 1c laterally spaced at an interval in order to support all parallel ozone-generating pipes 2 in the central portion of the body to maintain their horizontal position. The body has a feed gas chamber 1d formed between a left-end portion or plate 1b and the support plate 1c, and an ozonized gas chamber 1e between the right-end portion and the support plate 1c. A water jacket if is formed between the pair of the support plates 1c to cool the ozone-generating pipes 2. Furthermore, the body portion la has on its peripheral surface a feed gas inlet 1g, an ozonized gas outlet 1h, and an inlet 1i and an outlet 1j for ozone-cooling water, which are lead to the water jacket 1f. The body portion 1a and the end plate 1b are coupled via gaskets or air-tight seals, such as O-rings, using screws.

As shown in FIG. 8(b), an ozone-generating pipe 2 is formed of a tube shaped ground electrode 2a made of ozone-resistant stainless steel, a glass dielectric layer 2b lying on an inner surface of the ground electrode 2a, and a high-voltage electrode 2d of a hollow structure placed concentrically inside the ground electrode 2a to oppose to the dielectric layer 2b with a discharge gap 2c located between the high-voltage electrode 2d and the dielectric layer 2b. The ozone-generating pipes 2 are held between the support plates 1c of the gas chamber 1 and penetrate the support plates 1c laterally. Both ends of the ozone-generating pipe 2 respectively open to corresponding openings for the starting gas chamber 1d and the ozonized gas chamber 1e, which are formed in the gas chamber 1.

In addition, feeding leads 3, drawn out from each end surface of the high-voltage electrodes 2d of the ozone-generating pipes 2 inside the body of the gas chamber 1, i.e. feed gas chamber 1d, are connected to an external high-frequency power supply 5 via a bushing 4, which is provided on a peripheral surface of body portion 1a.

As a water-coolant system for the ozone-generating pipe 2, cooling water is supplied through an external cooling water circulating line 6 to the water jacket if of the gas chamber 1 and to each hollow-structured high-voltage electrode 2d of the ozone-generating pipes 2. 6a is a heat exchanger interposed between the water-cooling system and a secondary water-cooling system, 6b is a circulating pump, 6c is an ion exchanger, and 6d are manifolds. Cooling water conduit (insulating tube) 6e connected to the high-voltage electrodes 2d are drawn out to the ozonized gas chamber 1e in the body, and are branched and connected to the manifolds 6d.

As shown in FIG. 9, the ozone generator is combined with an oxygen production apparatus (feed gas source) 7 and an ozone-processing apparatus 8 (water supply and sewage treatment facility, or pulp-bleaching treatment facility) to introduce and supply a feed gas through a gas line 10 located between the feed gas inlet 1g of the gas chamber 1 and the oxygen production apparatus 7, and to supply the ozonized gas through a gas line 11 located between the ozonized gas outlet 1h and the ozone-processing apparatus 8. Reference number 12 designates a compression apparatus (pump) for compressing and transferring the ozonized gas.

With this structure, the oxygen-containing feed gas is introduced from the oxygen production apparatus (feed gas source) 7 into the body of the gas chamber 1 through the gas line 10, and is then discharged into the feed gas chamber 1d shown in FIG. 8(a). The gas is then distributed to the ozone-generating pipes 2, where the gas flows into the discharge gaps 2c. As the gas flows, a high-frequency voltage is applied to an area between the high-voltage electrode 2d and the ground electrode 2a, causing a silent discharge between the two electrodes and ozonizing a part of the feed gas, which then flows into the ozonized gas chamber 1e. In addition, the ozonized gas flown into the ozonized gas chamber 1e is supplied to the ozone-processing apparatus 8 through the gas line 11, which is connected to the ozonized gas outlet 1h.

An exhaust valve (not shown) is connected to the gas line connected to the gas outlet 1h, and the exhaust valve is adjusted to control the operating pressure of the ozone generator—that is, to adjust the pressure of the feed gas to a certain level, e.g. 0.17 MPa, for example. For example, when the ozonized gas generated by the ozone generator is to be used for a water supply treatment, the operating pressure of the apparatus is maintained at 0.17 Mpa. For pulp-bleaching treatment, the compression apparatus 12 (often a water-sealing pump) is installed in the middle of the gas line 11, as shown in FIG. 9, to increase the pressure of the ozonized gas to approximately 1 MPa before supplying it to the end use. Recently, the capacity and concentration of the ozone generators have increased as the scale of ozone-processing facilities has grown, due to the application of ozone for water supply sterilization and deodorization. However, it appears that as the ozone concentration generated in the ozone generator becomes higher, there raises the problems, which are described below.

Namely, when a voltage applied to the ozone-generating pipe is increased to produce thick or highly concentrated ozone efficiently, variation in the power supply voltage or the nature of the feed gas causes electric discharge in the discharge gap to shift from silent discharge to spark discharge, which ignites and decomposes ozone to thereby increase the gas pressures in the discharge space, thereby propagating flame outward. This phenomenon may be induced by ignition resulting from the system-generated static electricity, or by the ignition of an externally heated surface.

A graph in FIG. 10 shows the results of experiments on ozonolysis or ozone decomposition performed by the inventors. During the course of these experiments, ozonized oxygen of high ozone concentration was sealed in a closed container at an absolute pressure between 0.1 and 1.5 Mpa.

An electric current was conducted through a nichrome wire placed inside the container to heat. With the heat of the nichrome wire acting as an ignition energy, ozone was subjected to decompose by itself, i.e. autolysis, producing rapid increase of a gas pressure in the closed container. If a gas pressure ratio is defined as the ratio of a maximum pressure to an initial pressure, the gas pressure ratio begins to increase rapidly when an ozone concentration approaches 220 g/Nm$^3$ (in terms of 0° C. and 1 atom.), and reaches a value between 3.0 and 3.5 at approximately 250 g/Nm$^3$ or more. This trend is applicable to cases in which the sealing pressure of ozonized oxygen is changed from 0.1 to 1.5 MPa.

The ozone decomposing or ozonolysis mechanism is described in the thesis "THE OZONE TO OXYGEN FLAME (A. G. Streng and A. V. Grosse): 6th Symp (Int) on combustion No. 32 (1957). That is, as represented by formulae (1) to (3), ignition energy causes ozone to be decomposed into oxygen molecules and atoms (formula (1)), and ozone then joins with oxygen atoms to generate oxygen molecules (formula (2)). Finally, 1-mol ozone is decomposed into 1.5-mol oxygen molecules, and a 63.5-kcal exothermic reaction occurs (formula (3)). The resulting heat increases the gas molecule temperature and induces decomposition flame to thereby increase a gas pressure within the container. In addition, once this reaction produces decomposition flame, a decomposition chain reaction propagates flame from the ignition point to peripheral areas.

$$O_3 \rightarrow O_2 + O + 34 \text{ kcal} \quad (1)$$

$$O + O_3 \rightarrow 2O_2 + 93 \text{ kcal} \quad (2)$$

$$O_3 \rightarrow 1.5 O_2 + 63.5 \text{ kcal} \quad (3)$$

When ozone autolysis occurs inside the ozone generator and gas pressures increase as flame propagates, the following problems may occur to hinder use of the ozone generator; the ozonized oxygen, which is toxic to human, may leak between the body portion $1a$ and the end plate $1b$ of the gas chamber 1 of the ozone generator illustrated in FIG. 8($a$); the gas pressure may cause the ozone-generating pipes 2 to shift from the predetermined positions, so that the feeding leads 3 of the high-voltage electrodes contact the body portion $1a$ of the gas chamber 1, resulting in a short circuit; the gas in the system may be forced back to the feed gas source; and the ozone generator may be subjected to the gas pressure higher than that it was specified. If the internal structure of the ozone generator includes a flammable organic material, decomposition flame may lead to a fire.

The present invention has been made in view of the above problems. A primary object of the invention is to obviate the above problems and to provide an improved ozone generator capable of preventing outward propagation of decomposition flame of ozonized gas induced by spark discharge in an ozone-generating pipe to thereby establish safety of the ozone generator.

SUMMARY OF THE INVENTION

To attain the above object, the present invention provides an ozone generator comprising ozone-generating pipes, each being formed of a tube-shaped ground electrode with open ends, a high-voltage electrode disposed inside the ground electrode opposing the ground electrode, and a dielectric interposed in a discharge gap between the ground and high-voltage electrodes, and a gas chamber. The gas chamber houses the multiple ozone-generating pipes in parallel configuration within a central portion of its body, and also includes a feed gas chamber and an ozonized gas chamber formed at its respective lateral sides. The ozone generator allows an oxygen-containing feed gas introduced from a feed gas source into the feed gas chamber of the gas chamber through a gas line to flow through the discharge gaps in the ozone-generating pipes to cause silent discharge, thereby changing the feed gas to ozonized gas, which is then supplied through a gas line to an ozone-processing facility. Here, in a first aspect of the invention, gas-permeable flame-propagation-preventing members or bodies (flame arrester) are installed in a gas passage within a system to prevent outward propagation of decomposition flame of ozonized gas induced by spark discharge within the ozone-generating pipes. Depending on the specific purposes, the flame-propagation-preventing bodies are placed at the following positions:

(1) The flame-propagation-preventing members are positioned within each of the ozone-generating pipes at opposite end surfaces of the ground electrode for covering open end surfaces of the ozone-generating pipe (second aspect).

(2) The flame-propagation-preventing members are positioned within each of the ozone-generating pipes at opposite end surfaces of the high-voltage electrode to thereby create a discharge space within the pipe between the flame-propagation-preventing members (third aspect).

(3) The flame-propagation-preventing members are positioned within each of the ozone-generating pipes at the opposite end portions of the discharge gap between the high-voltage electrode and the ground voltage to thereby create an electric discharge space within the pipe located between the flame-propagation-preventing members (fourth aspect).

(4) The flame-propagation-preventing members are placed in each of the feed gas and ozonized gas chambers of the gas chamber, so that the assembly of the ozone-generating pipes is located between the flame-propagation-preventing members (fifth aspect).

(5) The flame-propagation-preventing members are placed in the gas line between the feed gas source and the gas chamber, and in the gas line between the ozonized gas chamber and the ozone-processing facility (sixth aspect).

In addition, the flame-propagation-preventing member is composed of a flame-extinguishing base material, formed either in an ozone-resistant net-shaped metallic or ceramic body or a porous sintered metal plate with gas-permeable holes distributed therein (seventh aspect).

When the gas-permeable flame-propagation-preventing members or bodies (flame arresters) are placed in the gas passage within the ozone generator, including the in-pipe discharge spaces in the ozone-generating pipes described above, during the normal operation, the feed gas and the ozonized gas directly permeate and flow through the flame-propagation-preventing members, and the feed gas is ozonized. If decomposition flame of high concentration ozone is generated in the discharge space due to a spark discharge, as the flame propagates outward while raising a gas pressure, the flame contacts the flame-propagation-preventing members formed of a stainless steel net. In this event, the heat-transfer characteristic of the flame-propagation-preventing members causes the combustion heat to disperse. The nets of the flame-propagation-preventing members also serve to separate the flame zone, increasing heat loss and preventing continuous combustion on the surfaces of the flame-propagation-preventing members. The flame is thereby extinguished and kept from propagating beyond the flame-propagation-preventing members, restraining any rapid increase in the gas pressure.

This sequence of events prevents problems on safety, such as leaks, ozonized gas counterflow from the gas chamber, and gas pressure in the ozone-processing apparatus exceeding a specified value, to maintain safety of the ozone generator.

BRIEF DESCRIPTION OF THE DRAWINGS

FIG. 2(a) is a side sectional view showing a configuration of an ozone-generating pipe corresponding to Example 2 of the present invention, and FIGS. 2(b) and 2(c) are longitudinal end views of the ozone-generating pipe with flame-propagation-preventing members installed on the end surfaces of a high-voltage electrode;

FIG. 3(a) is a side sectional view showing a configuration of an ozone-generating pipe corresponding to Example 3 of the present invention, and FIGS. 3(b) and 3(c) are longitudinal end views of the ozone-generating pipe with flame-propagation-preventing members interposed in the end portions of a discharge gap;

FIGS. 6(a)–6(c) are front views showing the structures of flame-propagation-preventing members applied to the examples of the present invention, wherein FIGS. 6(a), 6(b) and 6(c) are formed of wire gauge, porous sintered metal plate, and metal ribbon, respectively;

DETAILED DESCRIPTION OF PREFERRED EMBODIMENTS

Figure 1A:
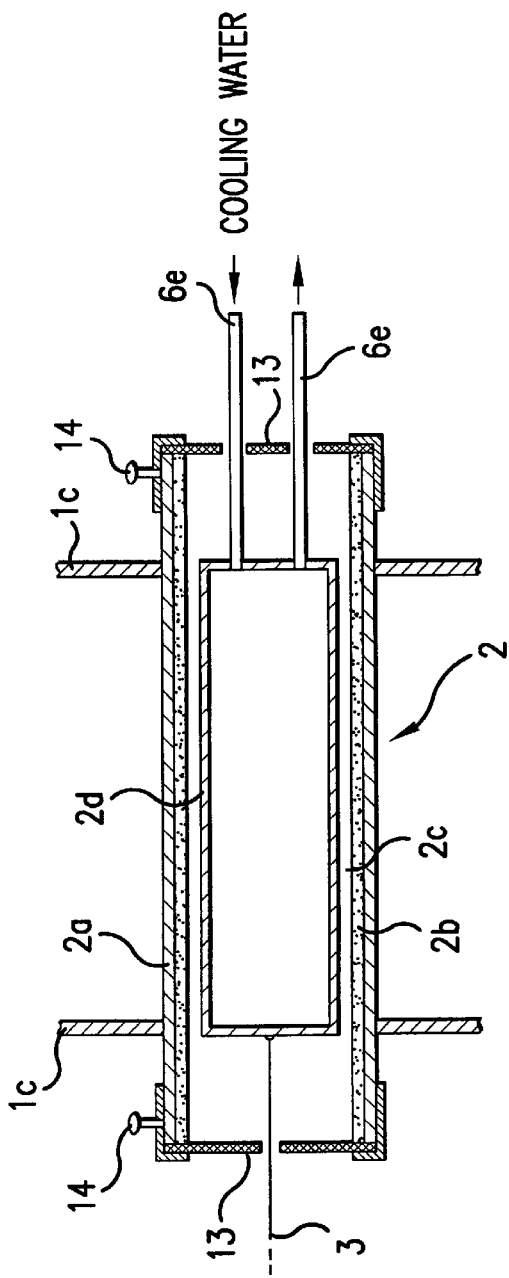
FIG. 1(a) is a side sectional view showing a configuration of an ozone-generating pipe corresponding to Example 1 of the present invention.

Embodiments of the present invention will be described based on illustrated examples. In each of the illustrated examples, the basic configuration of the ozone generator is similar to the ozone generator shown in FIGS. 8(a) and 8(b). The same reference numerals as in FIGS. 8(a) and 8(b) denote the same parts, and a detailed description thereof is omitted.

EXAMPLE 1

Figure 1B:
FIGS. 1(b) and 1(c) are end views of flame-propagation-preventing members installed at the opposite longitudinal surfaces of the ozone-generating pipe.
Figure 1C:
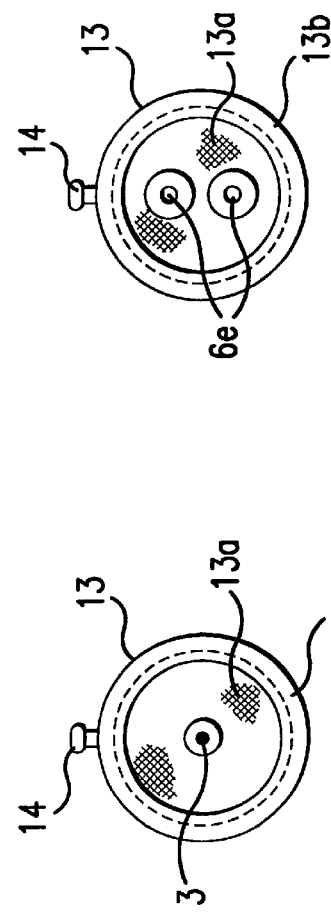
Figure 6A:
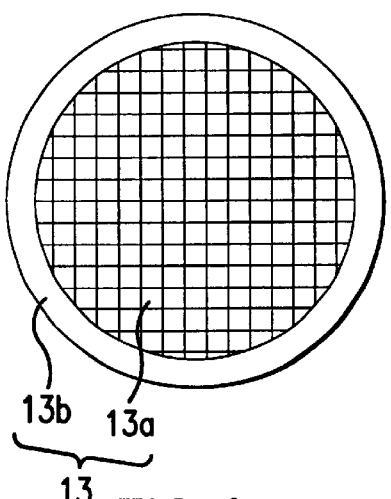

FIGS. 1(a) to 1(c) illustrate Example 1 of the present invention. According to this example, in ozone-generating pipes 2 assembled in a gas chamber 1 in parallel configuration (as in the structure in FIG. 8(a)), a flame-propagation-preventing member or body 13, called a "flame arrester", is installed at each of the opposite longitudinal end surfaces of a ground electrode 2a for covering each open end surface of each ozone-generating pipe 2. The flame-propagation-preventing body 13 is formed of a permeable, porous and ozone-resistant member made of metal or ceramic with thin continuous gaps. For example, as shown in FIG. 6(a), flame-propagation-preventing body 13 is comprised of an ozone-resistant stainless steel wire net 13a (for example, mesh number of 14; wire diameter of 0.5 mm; aperture of 1.3 mm; free area ratio of 52%) acting as a flame-extinguishing base material, and a frame 13b forming the periphery of the wire net, and is securely supported at each of the open ends of the ground electrode 2a via a fixture 14, such as a fastening screw.

Figure 8A:
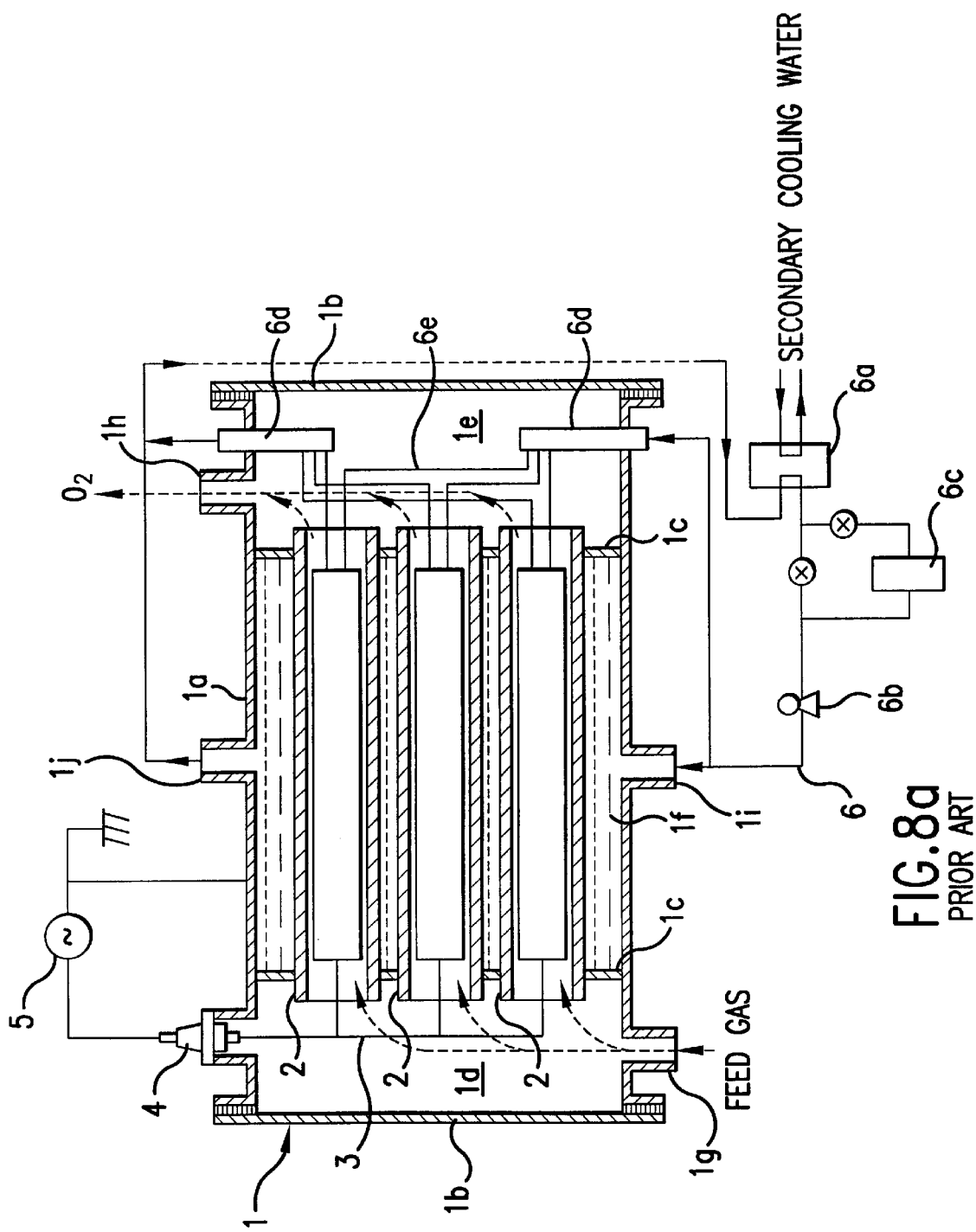
FIG. 8(a) is a side sectional view showing a configuration of a conventional ozone generator.
Figure 8B:
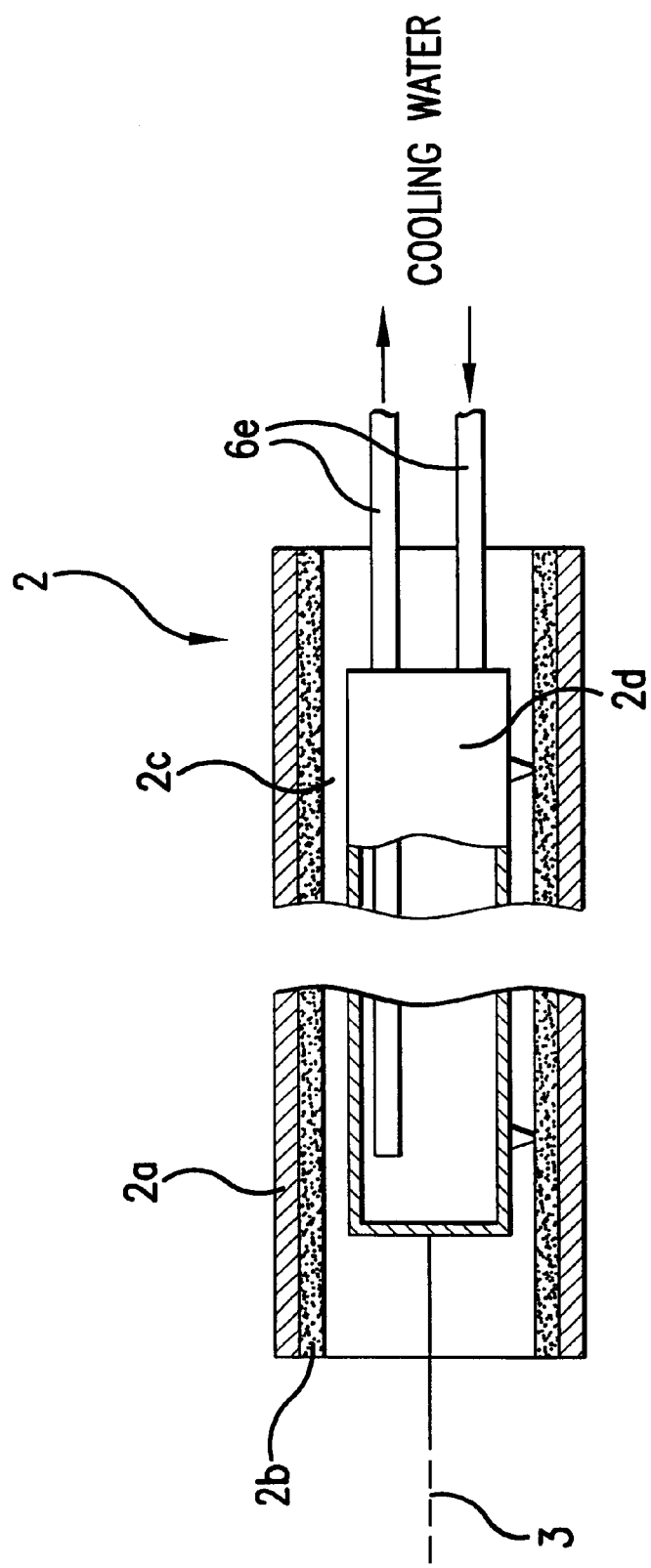
FIG. 8(b) is a sectional view of an ozone-generating pipe in FIG. 8(a)

The illustrated flame-propagation-preventing body 13 has a diameter of approximately 70 mm, which is almost equivalent to the outer diameter of the ground electrode 2a, and a wire net 13a of the flame-propagation-preventing body for covering the left end surface, that is opened toward the feed gas chamber 1d of the gas chamber 1 in FIG. 8(a), of the ozone-generating pipe 2 has a through-hole of approximately 10 mm in a central portion of the wire net 13a of the flame-propagation-preventing body, in which the lead 3 extending from the high-voltage electrode 2a penetrates the through-hole, as shown in FIG. 1(b). The stainless steel wire net 13a of the flame-propagation-preventing body for covering the right end surface, that is opened toward the ozonized gas chamber 1e of the gas chamber 1 in FIG. 8(a), has two pipe through-holes for two cooling water conduits 6e extending from an end surface of the high-voltage electrode 2d.

With this structure, the starting gas and ozonized gas easily permeate through the mesh of the stainless steel wire nets 13a during the normal operation of the ozone generator. If a spark discharge induced in the in-pipe discharge gap in the ozone generating pipe 2 ignites the gas, and the resulting decomposition flame propagates outward in the discharge space while raising the gas pressure, the decomposition flame propagates to the end surfaces of the ozone-generating pipe 2 and contacts the flame-propagation-preventing bodies 13. Heat transfer then dissipates the combustion energy of the flame and extinguishes the flame, thus preventing further propagation of the flame beyond the flame-propagation-preventing bodies 13 to exterior areas and preventing an abnormal increase in the gas pressure within the space (the feed gas chamber and ozonized gas chamber) formed inside the gas chamber.

Figure 6B:
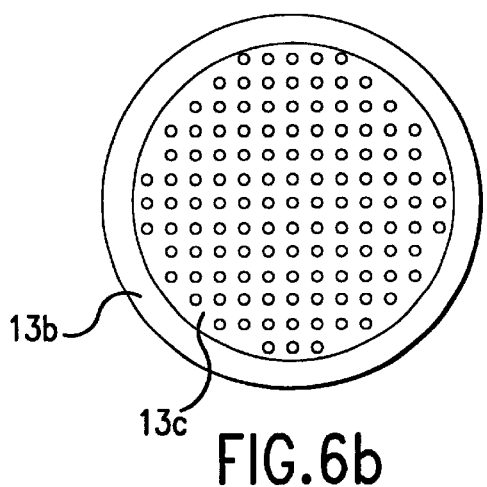
Figure 6C:
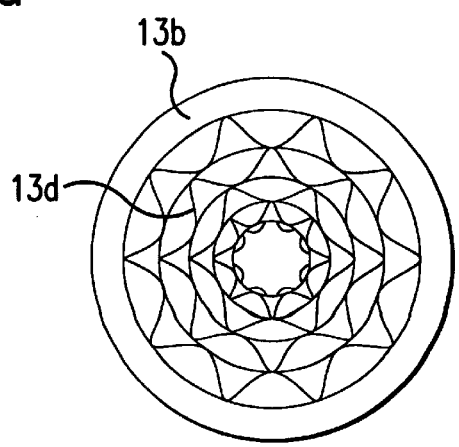

In addition to the stainless steel wire net 13a, which constitutes the flame-extinguishing base material in the structure described above, the flame-extinguishing base material of the flame-propagation-preventing body 13 may be a porous sintered metal plate 13c having gas-permeable holes distributed across its surface, which permit passage of gas, as shown in FIG. 6(b), or a ribbon-shaped metal plate (stainless steel foil) having a cell-like structure with approximately 10 mm in width and thickness of approximately 0.1 mm, which is pleated and wound in the form of a circle, as shown in FIG. 6(c). In addition to stainless steel, the material for the flame-extinguishing base material may be ceramic, including alumina or zirconia.

EXAMPLE 2

FIGS. 2(a) to 2(c) show Example 2 of the invention, that is a modification of Example 1. A flame-propagation-preventing members or bodies 13, each having a structure similar to the body described in Example 1, are installed within each ozone-generating pipe 2 to overlap opposite end surfaces of a high-voltage electrode 2d (which is set shorter than a ground electrode 2a and is inserted and located in the tube-shaped ground electrode), wherein a discharge space in the pipe is sandwiched between the flame-propagation-preventing bodies. Since a peripheral surface of the flame-propagation-preventing body 13 contacts a glass dielectric layer 2b, a short-circuit between the high-voltage electrode 2d and the ground electrode 2a is prevented, and electric field in the discharge gap between a peripheral surface of the high-voltage electrode 2d and the glass dielectric layer 2b remains almost entirely unaffected.

The flame-propagation-preventing body 13 has an outside dimension equal to the inner diameter of the glass dielectric layer 2b, which lies on an inner peripheral surface of the ground electrode 2a. After the assembly of the ozone-generating pipe 2, the flame-propagation-preventing bodies 13 are inserted into the ground electrode 2a from its opposite open ends, and are secured to positions at which they are pressed against the end surfaces of the high-voltage electrode 2d. Similar to Example 1, the flame-propagation-preventing body 13 installed on the left side of the ground electrode has a through-hole formed in its central portion, from which the lead 3 extends, while the flame-propagation-preventing body 13 installed on the right side of the ground electrode has pipe through-holes formed therein, from which cooling water conduits extend.

This example has similar effects to those of Example 1.

EXAMPLE 3

FIGS. 3(a) to 3(c) show Example 3 of the present invention, which is different from Example 2. The flame-propagation-preventing bodies 13 are installed in each ozone-generating pipe 2 and interposed between a peripheral surface of the high-voltage electrode 2d at both opposite end portions and the glass dielectric layer 2b lying on the ground electrode 2a, creating a discharge space within the pipe located between the flame-propagation-preventing bodies. In contrast to the previous examples, the flame-propagation-preventing body 13 is formed of a stainless steel wire net obtained by cutting stainless steel into pieces of approximately 10 mm in width, then installed by winding around the peripheral surface of the high-voltage electrode 2d. As in the previous examples, this configuration prevents the outward propagation of flame occurring in the discharge gap.

According to this example, the flame-propagation-preventing bodies 13 are located at the terminal portions of the high-voltage electrode 2d, so that its outer peripheral surface contacts the glass dielectric layer 2b as in Example 2, preventing interference with electric field within the discharge gap.

EXAMPLE 4

Figure 4A:
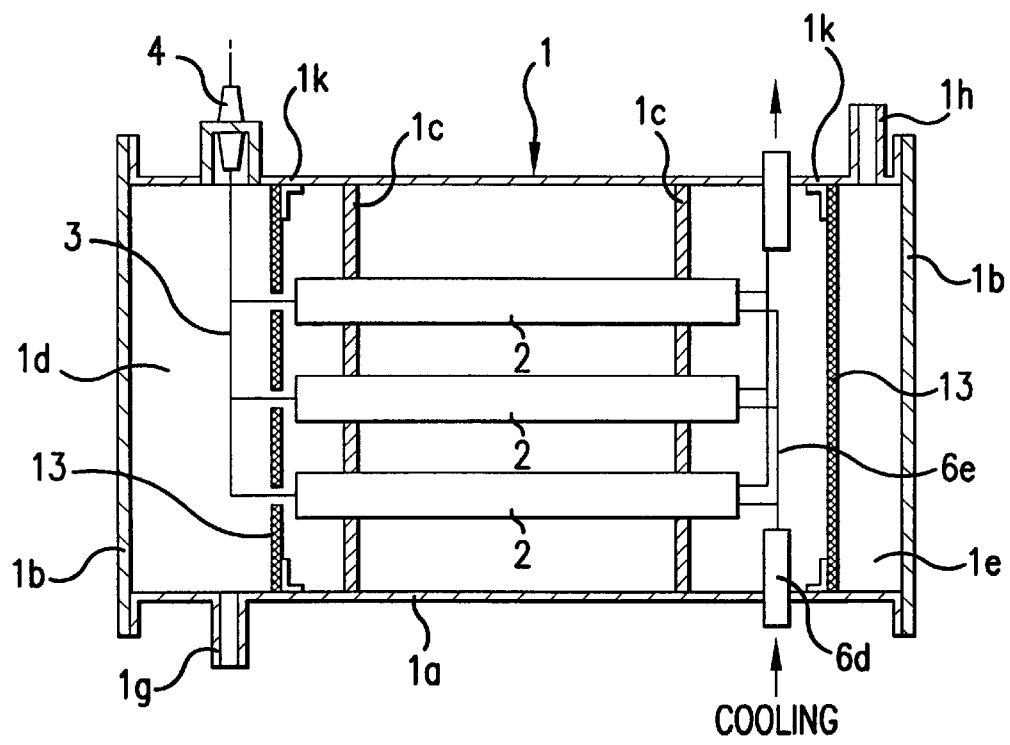
FIG. 4(a) is a side sectional view showing a configuration of an ozone-generating apparatus corresponding to Example 4 of the present invention.
Figure 4B:
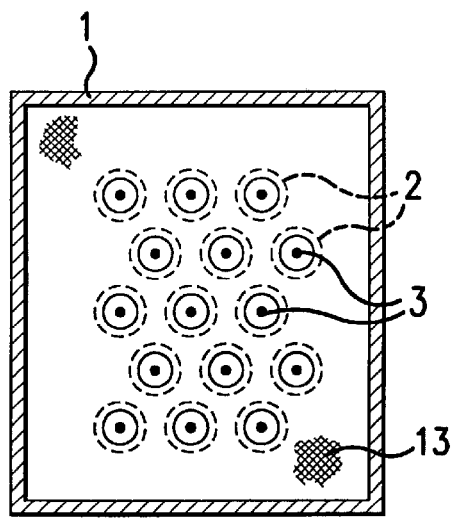
FIGS. 4(b) and 4(c) are sectional views of a feed gas chamber and an ozonized gas chamber, respectively, of a gas chamber with flame-propagation-preventing members installed therein.
Figure 4C:
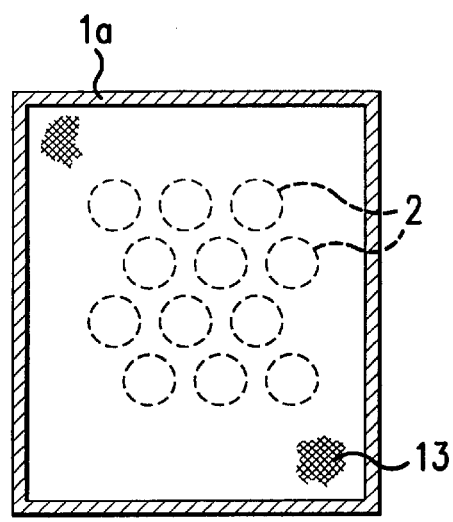

FIGS. 4(a) to 4(c) show Example 4. According to this example, the flame-propagation-preventing body 13 is placed in each of the feed gas chamber 1d and the ozonized gas chamber 1e of the gas chamber 1, so that the assembly of the ozone-generating pipes 2 supported in the gas chamber 1 in parallel configuration in the central portion of its body are located between the flame-propagation-preventing bodies. The flame-propagation-preventing body 13 is made of stainless steel wire net similar to the one described in Example 1; has an external dimension set to correspond to the cross section of the body portion 1a; and is secured to a fixture 1k provided on the body side with fastening screws. The flame-propagation-preventing body 13 placed in the feed gas chamber 1d has through-holes formed in its wire net surface, through which leads 3 extending from the ozone-generating pipes 2 pass. The flame-propagation-preventing body 13 placed in the ozonized gas chamber 1e is installed outside the cooling water conduit 6e extending from the high-voltage electrode 2d to avoid interference with the conduit 6e.

With this structure, during the operation of the ozone generator, even if a spark discharge occurs in any of the ozone-generating pipes 2 and ignites decomposition flame, the propagating decomposition flame contacts the flame-propagation-preventing bodies 13 installed outside the ozone-generating pipes 2 and loses combustion energy. In this way, the flame is prevented from further propagation, as described in the previous examples. This example also eliminates the need to install the flame-propagation-preventing bodes 13 in each of the ozone-generating pipes 2, reducing the number of required parts and making it more suitable for assembly and maintenance than the previous examples.

EXAMPLE 5

Figure 5A:
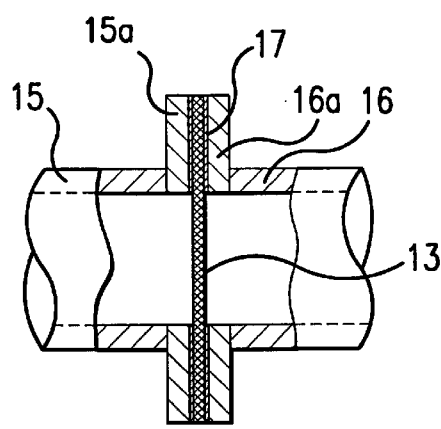
FIG. 5(a) is a side sectional view showing a configuration of an ozone-generating apparatus corresponding to Example 5 of the present invention.
Figure 5B:
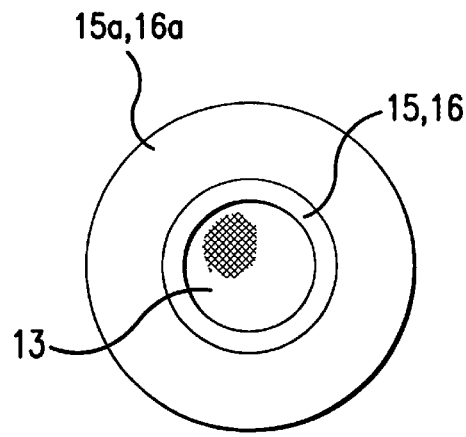
FIG. 5(b) is an end view of a gas line with a flame-propagation-preventing member interposed therein.
Figure 9:
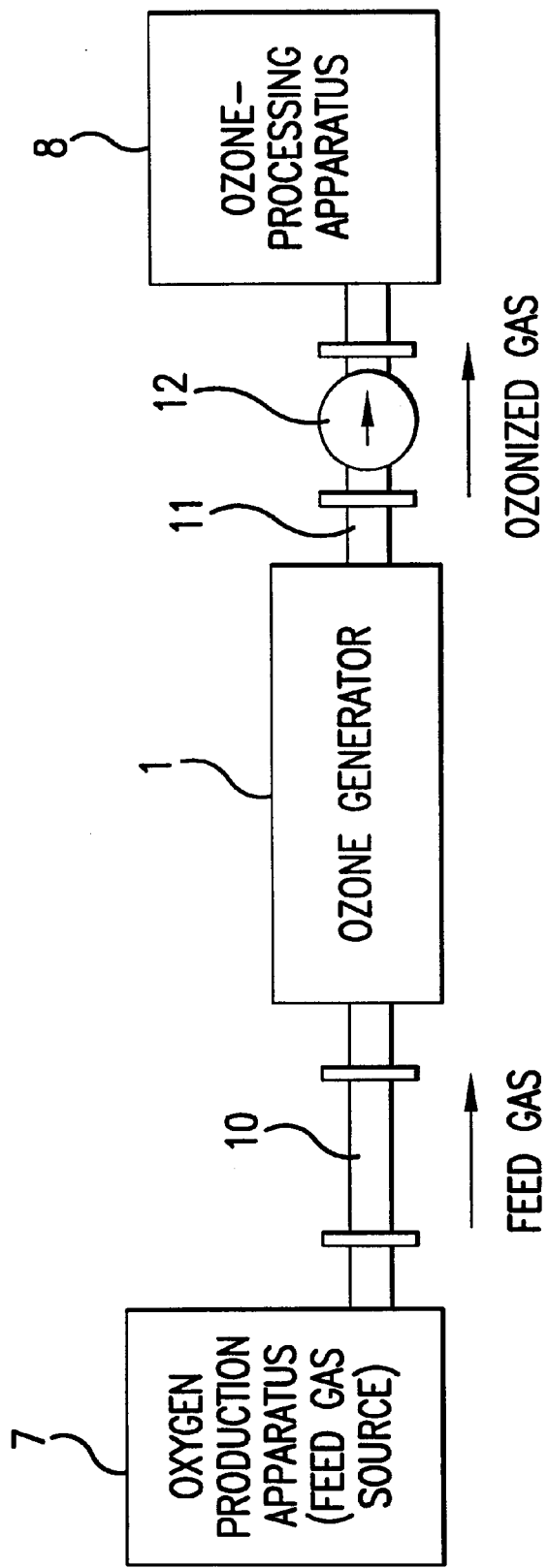
FIG. 9 is a diagram of an entire ozone generation facility comprised of the ozone generator, combined with a feed gas source and an ozone-processing apparatus.

FIGS. 5(a) and 5(b) show Example 5 of the present invention. According to this example, the flame-propagation-preventing bodes are interposed in the gas line 10 installed between the ozone generator and the feed gas source, and in the gas line 11 installed between the ozone generator and the ozone-processing apparatus, as shown in FIG. 9.

That is, in FIGS. 5(a) and 5(b), the disc-shaped flame-propagation-preventing body 13 shown in FIGS. 6(a) to 6(c) is interposed between a flange 15a of a gas conduit 15 (corresponding to the gas line 10, 11 in FIG. 9) and a flange 16a of a gas conduit 16 (corresponding to a gas line extending from the feed gas inlet 1g or ozonized gas outlet ih in FIG. 8) extending from the side of the ozone generator. The flame-propagation-preventing body is secured with screws (not shown) between the flanges via a packing member 17.

With this configuration, even if decomposition flame occurs in the flowing ozonized gas as the result of a spark discharge, static electricity in the ozone-generating pipe inside the ozone generator or external heating, and propagates toward the flame-propagation-preventing body 13 in the gas line, the flame contacts the flame-propagation-preventing body 13 and is precluded from further propagation, thereby preventing an increase in gas pressure associated with the decomposition flame from spreading to the feed gas source or the ozone-processing apparatus. According to this example, the flame-propagation-preventing body 13 interposed in the gas line can also be used as a backup for the flame-propagation-preventing bodies provided inside the ozone-generating apparatus in the previous Examples 1 to 4 in order to further improve the safety of the entire facility including the ozone generator.

Figure 7A:
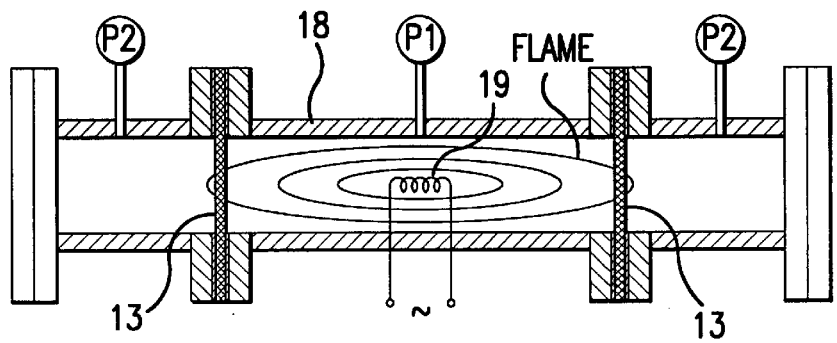
FIG. 7(a) is a side sectional view showing a configuration of an experimental apparatus.

Described below are the results of the experiments performed by the inventors to verify the effects of the flame-propagation-preventing bodies according to the above examples, with reference to FIGS. 7(a) and 7(b). FIG. 7(a) shows one configuration of this experimental apparatus. The flame-propagation-preventing bodies 13, each being comprised of a stainless steel wire net, were interposed into a gas conduit 18 of stainless steel with its opposite ends occluded by blind patches, at two locations in the middle of the gas conduit. A nichrome wire 19 was placed in a central portion of the pipe to produce ignition energy, and pressure gauges were placed at areas in and outside the flame-propagation-preventing bodies. Ozonized oxygen of different ozone concentrations was then sealed into the gas conduit 18 at a pressure of 0.1 Mpa. Current was then conducted through the nichrome wire 19 to ignite the gas and produce decomposition flame in the space located between the right and left flame-propagation-preventing bodies 13. The pressure gauges were used to measure resulting changes in pressure within the pipe.

Figure 7B:
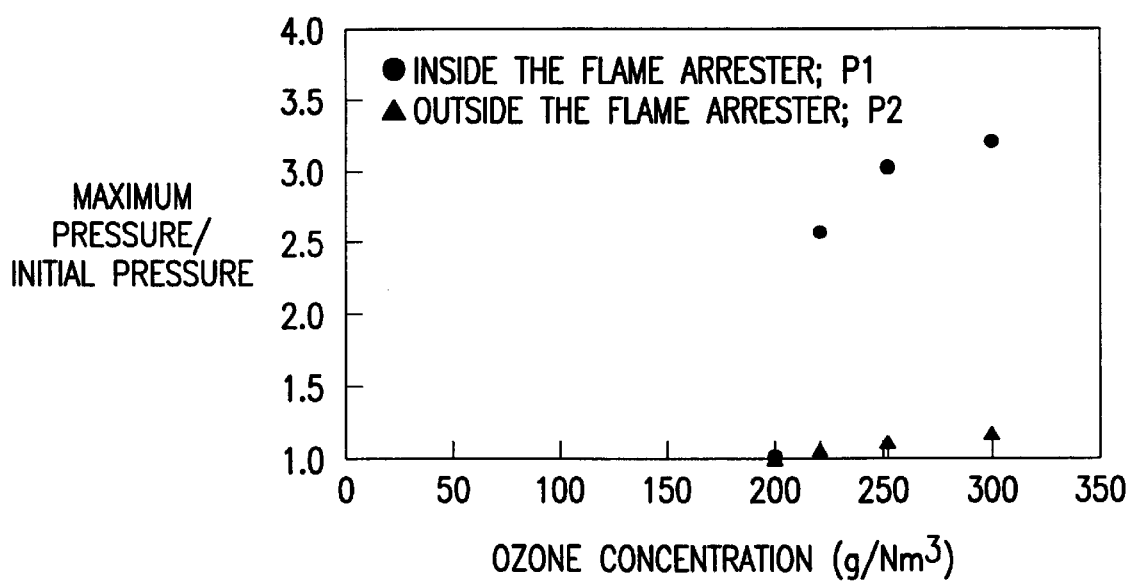
FIG. 7(b) is a graph showing the relationship between the ozone concentration and gas pressure ratio obtained from the results of the experiments.
Figure 10:
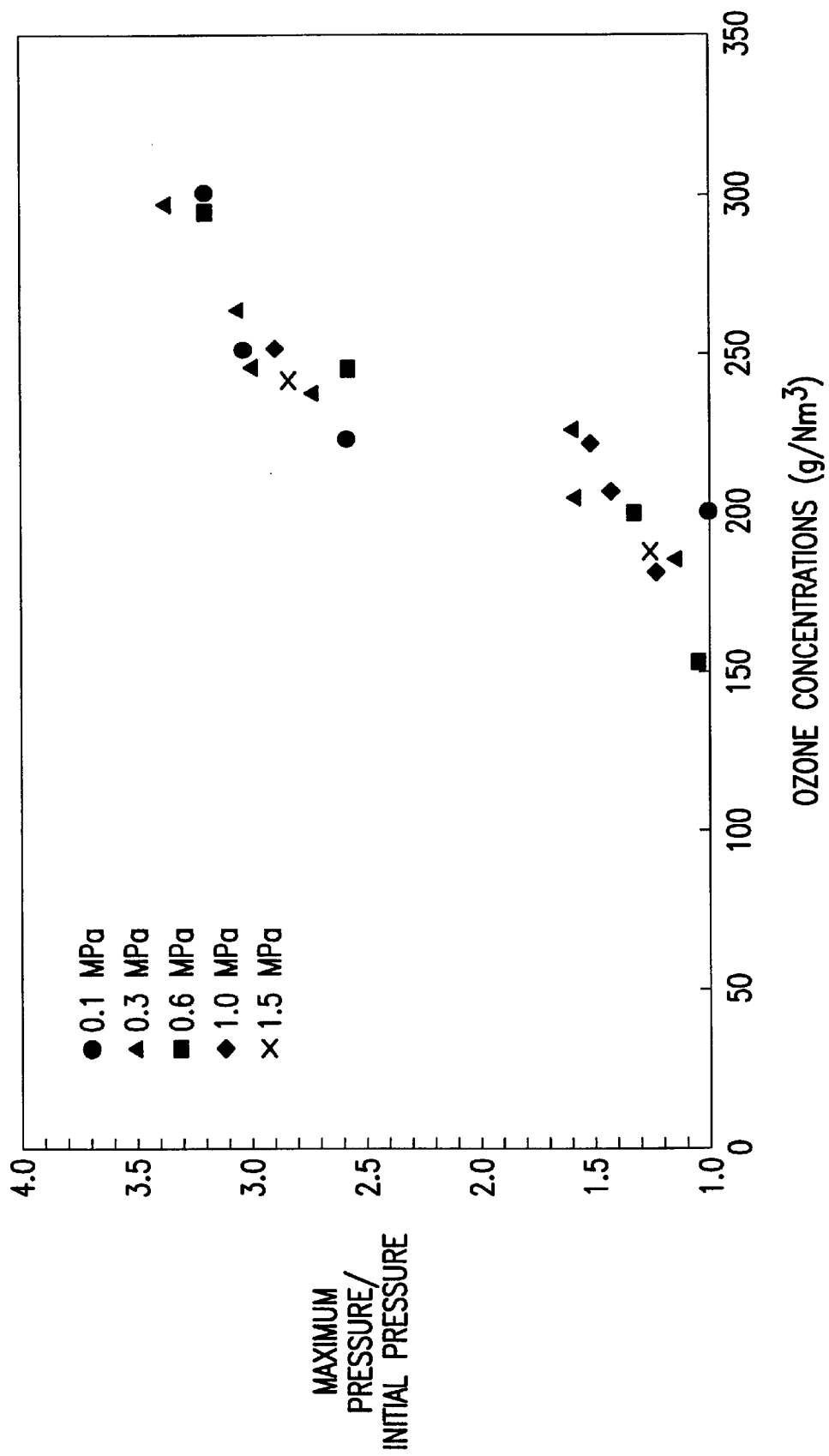
FIG. 10 is a diagram showing the relationship between ozone concentration and gas pressure ratio obtained from experiments, in which decomposition flame was induced in ozone inside a gas line not equipped with a flame-propagation-preventing member.

FIG. 7(b) is a graph showing ozone concentration and gas pressure ratio based on the measured data obtained in the experiments (gas pressure ratio is defined as the ratio of a maximum pressure to an initial pressure, as in FIG. 10). As shown by the figure, pressure P1 of the space in the central portion of the pipe, which is laterally partitioned by the flame-propagation-preventing bodies 13, significantly increases after ignition, whereas pressure P2 of the space outside the flame-propagation-preventing bodies 13 shows almost no increase. While propagating toward the opposite ends of the pipe and increasing pressure, the ozone decomposition flame induced by ignition contacts the flame-propagation-preventing bodies 13 and loses combustion energy, and is thus prevented from further propagation. The experiments demonstrate effective protection against the spread of flame and increased gas pressure to exterior spaces.

In these examples, the ozone-generating pipe 2 is shaped like a cylindrical tube, and its dielectric 2b is placed on the inner peripheral surface side of the ground electrode 2a. However, the flame-propagation-preventing body according to the present invention may also be implemented with and applied to an ozone generation tube having a dielectric formed on the outer peripheral surface side of the high-voltage electrode 2d. In addition, the ozone-generating pipe is not limited to a cylindrical tube, and may be used regardless of the method for cooling the ozone-generating pipes.

According to the structure of the present invention, the gas-permeable flame-propagation-preventing members or bodies (flame arresters) installed in the gas passage within the ozone generator prevent outward propagation of flame and increased gas pressure, and extinguish flame when a spark discharge in the discharge gap in the ozone-generating pipe ignites ozone during the operation of the ozone generator.

The invention prevents the safety problems of the ozone-processing apparatus, such as leakage of toxic ozonized gas, high15, voltage short-circuit, ozonized gas counterflow and gas pressure higher than the values specified, to permit safer use of the ozone-generating apparatus and of the entire ozone generation facility including this ozone generator.

While the invention has been explained with reference to the specific embodiments of the invention, the explanation is illustrative and the invention is limited only by the appended claims.

What is claimed is:

1. An ozone generator comprising:
    at least one ozone-generating pipe including a hollow ground electrode, a high-voltage electrode situated inside the ground electrode to face thereto to form a discharge gap between the ground electrode and the high-voltage electrode, and a dielectric interposed in the discharge gap between the ground electrode and the high-voltage electrode;
    a feed gas chamber connected to one side of the at least one ozone-generating pipe,
    an ozonized gas chamber connected to the other side of the at least one ozone-generating pipe so that when an oxygen-containing feed gas is supplied to the at least one ozone-generating pipe through the feed gas chamber, the feed gas is subjected to silent discharge in the gap to cause the feed gas to change to an ozonized gas, which is then transferred to the ozonized gas chamber, and
    gas-permeable flame-propagation-preventing members arranged to sandwich at least the discharge gap therebetween and configured to prevent outward propagation of ozonized gas decomposition flame in case the flame is induced to the ozonized gas by spark discharge in the at least one ozone-generating pipe.

2. An ozone generator according to claim 1, further comprising a gas chamber containing the feed gas chamber and the ozonized gas chamber, a plurality of said ozone-generating pipes being arranged parallel to each other and supported in a central portion thereof.

3. An ozone generator according to claim 2, wherein said flame-propagation-preventing members are positioned in the feed gas and ozonized gas chambers such that the ozone-generating pipes are located between the flame-propagation-preventing members.

4. An ozone generator according to claim 1, wherein said flame-propagation-preventing members are positioned in the at least one ozone-generating pipe on opposite end surfaces of the ground electrode for covering open end surfaces of the ozone-generating pipe.

5. An ozone generator according to claim 1, wherein said flame-propagation-preventing members are placed in the at least one ozone-generating pipe on opposite end surfaces of the high-voltage electrode to sandwich the discharge gap in the pipe.

6. An ozone generator according to claim 1, wherein said frame-propagation-preventing members are positioned in the at least one ozone-generating pipe at opposite end portions of the discharge gap between the high-voltage electrode and the ground voltage.

7. An ozone generator according to claim 1, further comprising a first gas line extending from the feed gas chamber to a feed gas source, and a second gas line extending from the ozonized gas chamber to an ozone-processing facility, said flame-propagation-preventing members being positioned in the first and second gas lines.

8. An ozone generator according to claim 1, wherein each of the flame-propagation-preventing member is formed of a flame-extinguishing base material made of a material selected from a group consisting of ozone-resistant net-shaped metal, ceramic member and a porous sintered metal plate with gas-permeable holes distributed therein.

\* \* \* \* \*

UNITED STATES PATENT AND TRADEMARK OFFICE
CERTIFICATE OF CORRECTION

PATENT NO. : 6,264,897 B1
DATED : July 24, 2001
INVENTOR(S) : Hisamichi Ishioka, Kazuki Kai, Takaya Nishikawa, Eiji Sakai, Terushige Ogawa, Atsumi Miyake It is certified that error appears in the above-identified patent and that said Letters Patent is hereby corrected as shown below:

Column 2,
Line 44, make a new paragraph from "Recently, ...";
Lines 23 and 32, change "bodes" to -- bodies --; and Column 9,
Line 55, change "high15, voltage" to -- high-voltage --.

Signed and Sealed this

Fifth Day of March, 2002

Attest:

Attesting Officer

JAMES E. ROGAN
Director of the United States Patent and Trademark Office